Patented Dec. 5, 1922.

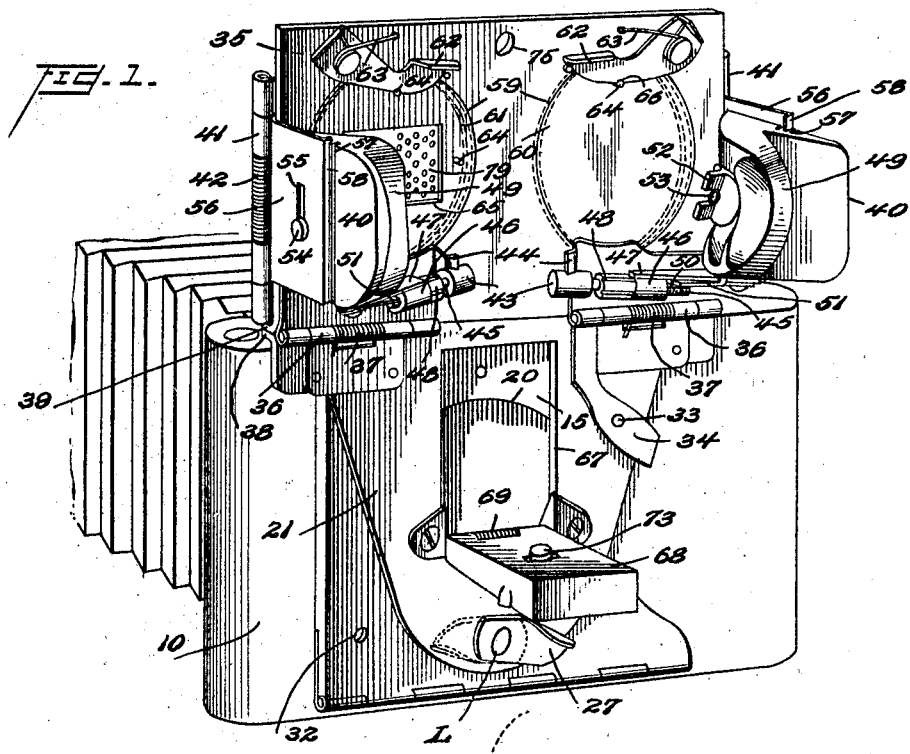

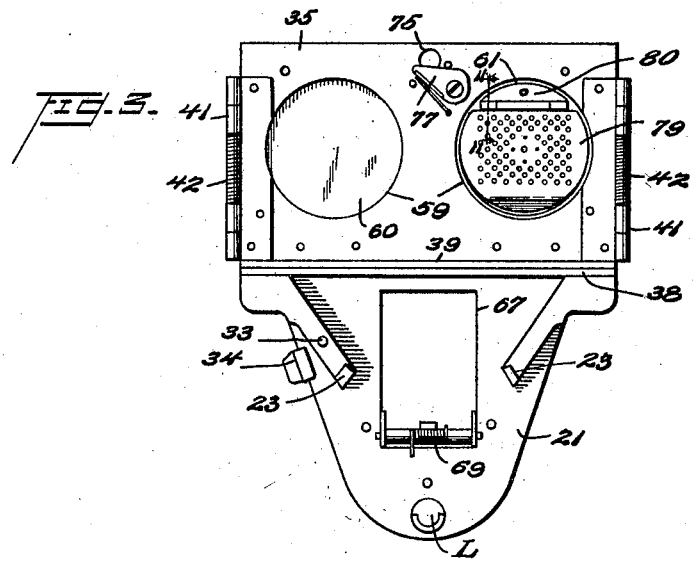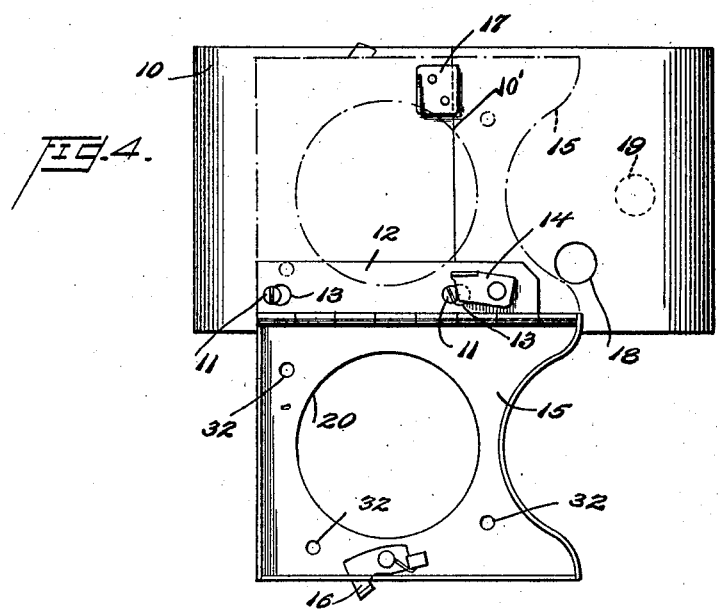

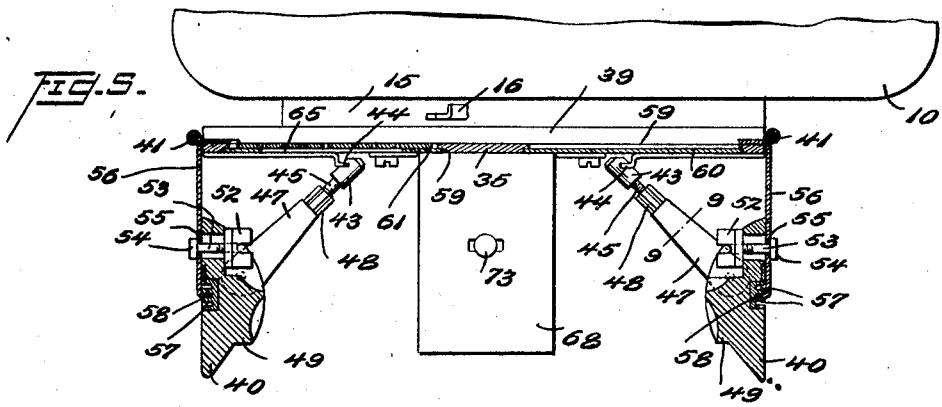
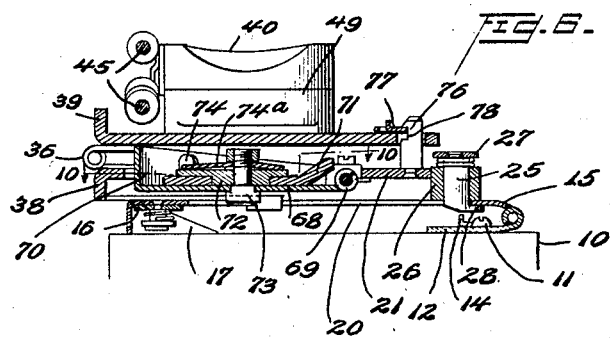
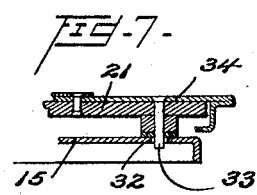
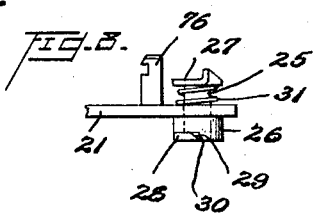
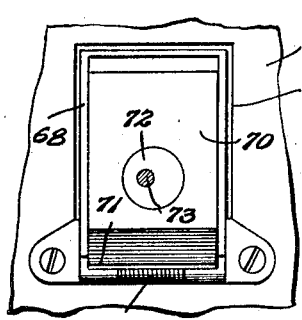
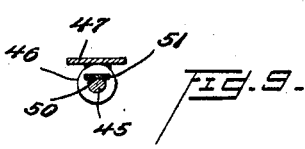

1,437,765

UNITED STATES PATENT OFFICE.

HERBERT A. McCALLUM, OF YONKERS, NEW YORK.

VIEW FINDER FOR CAMERAS.

Application filed July 31, 1920. Serial No. 400,313.

*To all whom it may concern:*

Be it known that I, HERBERT A. McCALLUM, a citizen of the United States, and a resident of Yonkers, in the county of Westchester, State of New York, have invented certain new and useful Improvements in View Finders for Cameras, of which the following is a specification.

This invention relates to camera finders of the type disclosed in Patents Numbers 1,340,618 and 1,340,619 issued to me May 18, 1920. The finders illustrated and described in these patents are adapted to be attached to the back of a camera and are provided with abutments against which the operator places his head, which is thereby definitely positioned relatively to the camera and finder, with one of the operator's eyes aligned with a view aperture through which are visible all objects in the field of the camera. Movement of the observer's head in seeking the desired view automatically points the camera and as soon as the observer can see the objects of which he wishes to take a picture, through the view aperture, the exposure may be made.

The objects of the present inventiton are to provide a view finder of this class having improvements which render it more easily adjustable to suit persons having different facial configurations, more adaptable for attachment to cameras of different kinds, and generally more convenient in use. These objects are realized by the incorporation of a number of novel features with the basic features of my prior inventions, the principal features of novelty consisting in; a special construction whereby the finder may be secured to a camera having an autographic window and a removable back without preventing the use of the window for autographing purposes or preventing the removal of the back, the entire finder being at the same time easily removable for transportation; improved means for supporting the finder so that it may be quickly and easily turned for the purpose of taking pictures with the long axis of the film either vertically or horizontally disposed; providing abutments or eye pieces for preventing lateral movement of the finder with respect to the head of the observer which are adjustable vertically, laterally, and also toward and away from the plate in which the view aperture is located to accommodate different observers; providing a chin abutment having novel means for vertical adjustment so that its outer end may be vertically adjusted at will; pivotally supporting the chin abutment and top plate upon the frame in such manner that when folded to inoperative position the top plate overlies and secures the chin abutment in such position, a single latch serving to hold them in this position against the action of springs which return them to operative position immediately upon the release of the latch; providing springs for automatically moving the eye pieces from operative to inoperative position when the hook members which secure these abutments in operative position are released, the springs serving also to maintain the eye piece hooks in locking engagement with cooperating catches on the top plate when the eye pieces are in operative position; providing novel means for locking the rotatable disc in which the oblong view aperture is located with its longitudinal axis either horizontally or vertically disposed so that the longitudinal axis of the view aperture is truly parallel with the longitudinal axis of the film; and arranging the holes in the perforated plate which covers the view aperture in a more advantageous manner so that very little of the view is obstructed thereby while its effectiveness for other purposes is not decreased.

Other advantages and objects of the invention will be apparent as it is disclosed in the following description when taken in connection with the accompanying drawings in which Figure 1 is a perspective view of a folding camera as seen from the rear and showing the finder attached thereto;

Figure 2 is a side view of the same, the outline of an observer's face being shown in dotted lines;

Figure 3 is a view of the finder as seen from the front, the finder having been detached from the camera and base plate;

Figure 4 is a rear view of a camera showing the means for attaching the base plate to which the finder is secured;

Figure 5 is a section on line 5—5 of Figure 2;

Figure 6 is a vertical section through the finder in folded or inoperative position;

Figure 7 is a section through a detail;

Figure 8 is an elevation of a detail;

Figure 9 is a section on line 9—9 of Figure 5;

Figure 10 is a section on line 10—10 of Figure 6, and

Figure 11 is a section on line 11—11 of Figure 3.

It will be understood that the finder may be applied to cameras of many types including moving picture machines, pocket cameras and cameras for use on tripods, although it is particularly useful in connection with the usual small size camera carried by hand from place to place and used principally in taking pictures with instantaneous exposure.

In the drawings the finder is shown attached to a camera having a back plate 10 formed in two similar portions the edges of which abut along line 10′ and which are latched together when the camera is in use but may be unlatched and drawn apart in removing the back. Secured to one section of the back plate and adjacent the lower edge thereof are two headed pins or screws 11. A metal plate 12 is provided with key slots 13 adapted to receive the pins 11 and a latch 14 pivotally secured to plate 12, is adapted to be swung to the position shown in Fig. 4 with its free end engaging one of the pins 11 to lock the plate in position. The plate 12 however, and the base plate 15 which is hinged thereto, may be removed from the camera whenever desired, by manipulating the latch 14. The base plate 15 supports the finder and is normally in the position indicated in dotted lines in Fig. 4, with its spring latch 16 in engagement with a catch 17 secured to the back of the camera. The autographic feature of the camera is located in the area covered by the base plate and when it is desired to use this feature the base plate and finder attached thereto are swung away from the camera back, and again returned to original position and secured by latch 16 when this operation has been completed. The window in the back of the camera through which the numerals on the film are observed is indicated at 18 and a concealed latch is indicated at 19 which is pressed when the operator desires to unlatch the halves of the back plate, for the purpose of removing the same. It has already been pointed out that the screws or pins 11 are both secured to the same portion of the separable back, and hence the finder does not interfere in any manner with the removal of the back from the camera.

The base plate 15 is provided with a circular aperture 20 and the frame 21 of the finder is provided with two hooks or lugs 23 adapted to extend around under the edge of this circular aperture and to cooperate with the latch L in removably securing the finder to the base plate. Latch L is clearly illustrated in Figs. 6 and 8 and comprises a rotatable stem 25 extending through a sleeve 26 rigidly secured to the frame 21 and is adapted to have limited longitudinal movement in said sleeve. To the upper end of stem 25 is secured lever 27 adapted to be grasped by the fingers to rotate the stem, and to its lower end is secured a segmental flange 28 having a beveled edge 29 which is adapted to ride over the edge 30 of member 26 to cam the stem 25 downwardly, Figs. 6 and 8, against the tension of spring 31 which normally tends to maintain the stem in its uppermost position. In the attachment of the frame 21 to the base plate 15 the frame is superposed on the base plate in such manner that hooks 23 extend under and engage the edge of circular aperture 20 and lever 27 rotated in a counter-clockwise direction from the position indicated in dotted lines in Fig. 1 to the position indicated in full lines in this figure. In this rotation the segmental flange 28 will be moved from the position illustrated in Fig. 8 to the position illustrated in Fig. 6 in which the edge of base plate 15 is pinched between the lower edge of the sleeve 26 and the flange 28. To attain this final position two camming actions by the inclined face 29 of the flange 28 are necessary, the first causing it to ride over the edge 30 of sleeve 26 and the second occurring when the inclined edge 29 strikes the edge of the aperture 20. The spring 31 is of such strength that the lever 27 is frictionally held against accidental rotation. It will be seen that the above construction permits the frame to be quickly and easily removed from the base plate and reattached.

In the operation of the finder it is desired that it be adjustable for taking pictures with the long axis of the film either vertically or horizontally disposed. For this purpose the frame may be rotated relative to the base plate. the hooks 23 and the latch L being freely slidable along the edge of the base plate. Three holes 32 are made in the base plate which serve as catches for a latch pin 33, clearly illustrated in Fig. 7, which extends through the frame 15 and is normally forced downwardly by a flat spring 34 secured to the frame. The three holes 32 are arranged 90° apart around the center of aperture 20, and when pin 33 is in engagement with any one of these holes the finder is in operative position although it will be understood that in two of these positions the finder is arranged for taking pictures with the long axis of the film horizontal and in the third position with the long axis of the film vertical. To change the finder from one position to another it is only necessary to raise pin 33 from the hole into which it projects by lifting the end of the flat spring 34, rotating the finder to its new position and allowing the pin 33 to enter the hole corresponding to this new position.

The finder includes, in addition to the frame member 21 having the substantially triangular shape illustrated, a top plate 35 which is secured thereto by hinges 36, the frame and top plate being adapted to fold together to inoperative position, or to be extended as illustrated in Fig. 1. Springs 37 located at hinges 36 normally tend to throw the top plate to open or operative position, and the rotation of plate 35 around the axis through hinges 36 is limited by the abutment of laterally extending flanges 38 and 39 on the frame and top plate respectively. Abutments or eye pieces 40 of the type described in my prior patents mentioned are hinged at 41 to the opposite vertical edges of the top plate and springs 42 normally tend to swing these abutments from their operative positions, illustrated in Figs. 1 and 5, to the inoperative positions, illustrated in Fig. 6, in which they lie behind the top plate 35. To hold these abutments in operative position hooks 43 are provided each of which is adapted to engage a catch 44 fastened to the top plate. The springs 42 by tending to rotate these abutments to inoperative position also tend to maintain the hooks 43 in constant engagement with the catches 44 to prevent the accidental disengagement of the hooks.

Hooks 43 have threaded shanks 45 which engage the threaded inner wall of sleeves 46 secured to arms 47 which are in turn pivotally secured to the lower portions of eye pieces 40. Lock nuts 48 are provided on the shanks which are adapted to be forced against the edges of sleeves 46 to lock the shanks against rotation. The shanks 45 are threaded for the purpose of adjusting their lengths so that the abutments 40 may be brought closer together or moved apart as desired, to accommodate observers whose heads are of different widths, the shoulders 49 of the abutments being adapted to rest against the forwardly facing outer edges of the eye sockets. The end portions of the shanks 45 are flattened on the sides as at 50 (see Fig. 9) and flat springs 51 secured to members 47 normally bear against the respective flattened portions of the shanks and cooperate with the lock nut in preventing accidental rotation thereof. The flattened faces, acting in conjunction with the flat springs have additional functions, namely, to assist in properly positioning the hooks for engagement with the corresponding catches after they have been adjusted for length. To make an adjustment to one of the hooks it is only necessary to back off the lock nut 48 and rotate the hook and shank the desired number of turns in either direction. The flat spring indicates when a whole number of turns has been made and the hook is facing the catch, and when the shank has been lengthened or shortened the desired distance the lock nut 48 is again brought into engagement with sleeve 46. An upward and downward adjustment of eye pieces or abutments 40 may be made by loosening wing nuts 52 which have threaded engagement with bolts 53 extending through abutments 40 and having headed ends 54. Bolts 53 extend through vertical slots 55 in hinge plates 56, and, when the wing nuts have been loosened the abutments may be moved vertically to the position desired, the bolts 53 sliding in slots 55, and the abutments may be clamped in such position by tightening the wing nuts.

In order to provide for adjustment of the abutments 40 toward and from the top plate 35 a series of vertical slots 57 are provided in each, and laterally extending flanges 58 of hinge plates 56 are provided which are adapted to enter any pair of these slots. This adjustment is made by loosening the wing nuts 52 as before, so that the abutments may be moved away from the hinge plates 56, and by then moving the abutments toward and away from plate 35 until flanges 58 may be inserted in the proper slots 57. Either abutment may be adjusted vertically or horizontally independently of the other.

Suitable circular apertures 59 are provided in the top plate 35 and imperforate disc 60 and apertured disc 61 are positioned in these circular apertures, the discs being interchangeable so that the disc having the view aperture may be placed opposite either eye of the observer. The disc receiving apertures in the plate 35 are countersunk, the edge of the countersunk portion being indicated in dotted lines (Fig. 1) and the discs are held in position against the countersunk shoulders by the upper edges of plates secured firmly to the top plate 35, the inner ends of which comprise catches 44, and by latches 62 normally pressed by springs 63 downwardly against pins or stops 64 secured to the discs. The apertured disc 61 is provided with two pins 64 and this disc is rotatable relatively to the plate so that the oblong sight opening or aperture 65 may have its long axis either horizontally or vertically disposed to be parallel with the long axis of the camera film. The latches 62 are notched at 66, the notches being adapted to receive pins 64 so that the disc 61 may be definitely located and locked in either of its positions. To remove either disc from its seat it is only necessary to raise the latch 62 corresponding thereto and lift the disc so that its lower edge disengages the plate which overlaps it at the bottom. The discs may be interchanged so that the disc having the sight opening may be opposite either eye of the observer.

The frame 21 is provided with a central oblong aperture 67 and at the lower edge of this aperture is pivotally supported the chin abutment 68, a spring 69 normally tending to rotate this chin abutment to operative position as illustrated in Fig. 1. The outer end of the chin abutment is adapted to bear against the lower portion of the observer's face, as shown in Fig. 2, and to render the same adjustable it is provided with a longitudinally movable plate 70 having a foot 71 adapted to bear against the frame 15 when in operative position, and having means for sliding this member 70 relatively to the chin abutment. This last mentioned means comprises a disc 72 fitting within a circular aperture in plate 70 and eccentrically pivoted on pin 73 which extends through the top of the chin abutment. Disc 72 has a bottom flange integral therewith which is extended to form an operating lever 74. A flat spring 74ª bears downwardly against the nut on pin 73 and upwardly on the operating lever, forcing the latter against plate 70 so that considerable force is needed to manipulate the lever, thereby insuring against accidental movement thereof. By swinging this lever around the pin 73 as a center the eccentric disc 72 is revolved to move the plate 70 forwardly or rearwardly as desired to alter the angular position of the abutment, the foot of the plate bearing against the frame, when the abutment is in operative position.

To place the finder in inoperative position without disconnecting it from the camera the hooks 43 are released from catches 44 and the eye abutments allowed to swing behind the plate 35. The chin abutment 68 is then swung around its pivotal point against the action of spring 69 until it lies within the oblong aperture 67. The top plate 35 is then rotated downwardly until the aperture 75 therein has passed over the upper end of catch 76 mounted on the frame, and the spring latch 77 mounted on the top plate has entered the notch 78 in the pin. In this position the top plate serves as a securing means for the chin abutment, which has no independent securing means and upon release of the single latch 77 both the top plate and the chin abutment automatically move under the influence of the springs, into operative position.

In my prior Patent No. 1,340,619 I describe, illustrate and claim a plate hinged to the apertured disc and having a plurality of small perforations, the outer rows of which determine the outline of the view visible to the observer, which is of the same shape as the exposure aperture of the camera. This plate has a number of advantages such as correcting for astigmatism of the observer's eye and enabling the observer to rivet his attention on some particular object, visible through one of the small holes, so that he may hold his head perfectly still and take time exposures. For the latter purpose the central portion of the plate is imperforate, except for a hole located exactly in the center and exactly in front of the observer's eye. It is necessary to provide such an imperforate area so that the center hole may be distinguished from the others, but it is obvious that a considerable portion of the view is obscured thereby.

In the present invention a perforated plate 79 of this character is hinged to the apertured disc 61 in such manner that it may be readily swung away from this aperture if the observer desires an unobstructed view, a flat spring 80 being provided having portions adapted to bear against or frictionally engage the hinges of the plate so that it will remain in any position to which it is turned. The lower portion of the plate is turned outwardly so that it may be easily grasped by the fingers of the operator. The holes are all of the same size except the eight holes nearest the center hole which are smaller than the others, the four quite near the center being the smallest of all.

This arrangement permits the operator to easily distinguish the center hole, while at the same time a smaller portion of the view is obscured inasmuch as the smaller central holes lessen the extent of the imperforate area. By having the holes adjacent the center hole much smaller than the center hole very little of the view is blocked and yet the center hole is easily distinguishable from the others.

Numerous changes may be made in the design and arrangement of the parts of the finder within the scope of the invention, which is not limited to the precise embodiment disclosed.

Having thus described my invention what I claim as new and desire to secure by Letters Patent is:

1. In combination with a camera, a view finder which includes a frame adapted to be supported on the camera, a chin abutment, a plate having a view aperture, said chin abutment and plate being secured to the frame and each being adapted to be folded relatively thereto to inoperative position and unfolded to operative position, a single latch for holding said chin abutment and plate in inoperative position, and spring means for automatically moving said abutment and plate to operative position upon the release of said latch.

2. In combination with a camera, a view finder which includes a frame adapted to be supported on the camera, a chin abutment, a plate having a view aperture, said chin abutment and plate being pivotally secured to the frame and each being adapted to be folded relatively thereto to inoperative position with the plate overlying and securing the chin abutment, a latch for holding said plate in inoperative position and spring means for automatically moving said abutment and plate to operative position upon the release of said latch.

3. In combination with a camera, a view finder which includes a frame adapted to be supported on the camera, a chin abutment hinged to said frame, a plate having a view aperture therein also hinged to said frame, said chin abutment and plate being adapted to be folded relatively to the first mentioned plate to inoperative position, with the second plate overlying and securing the chin abutment, a latch for securing the plate in inoperative position, and springs located at the hinges of said abutment and plate respectively for automatically moving the same to operative position upon the release of said latch.

4. In combination with a camera, a view finder including a plate having a view aperture, means constructed and arranged to hold the plate with the aperture in fixed relation to one of the observer's eyes including an abutment adapted to rest against the side of the operator's head, said abutment being movable to either extended and operative or nested and inoperative position, a spring normally tending to move said abutment to inoperative position, and a device for releasably securing said abutment in operative position.

5. In combination with a camera, a view finder including a plate having a view aperture, means constructed and arranged to hold the plate with the aperture in fixed relation to one of the observer's eyes including an abutment adapted to rest against the side of the operator's head, said abutment being movable to either extended and operative or nested and inoperative position, a spring normally tending to move said abutment to inoperative position, and a device for releasably securing said abutment in operative position which comprises interlocking members on the abutment and plate normally held in engagement by the tension of the spring.

6. In combination with a camera, a view finder including a plate having a view aperture, means constructed and arranged to hold the plate with the aperture in fixed relation to one of the observer's eyes including an abutment adapted to rest against the side of the observer's head, said abutment being movable to either extended and operative or nested and inoperative position, a spring normally tending to move said abutment to inoperative position, a hook having a threaded shank with a flattened portion, a member attached to the abutment and having a threaded opening to receive said shank, whereby the distance of the hook from the abutment may be adjusted by rotating the shank, a catch secured to the plate, and a spring pressing against the shank and adapted to engage the flattened portion thereof when the hook has been turned to proper position to engage the catch.

7. In combination with a camera, a view finder including a plate having a view aperture, means constructed and designed to hold the plate with the aperture in fixed relation to one of the observer's eyes including an abutment adapted to rest against the outer margin of the eye socket, and adjustable means for supporting said abutment whereby the distance between the abutment and view aperture may be varied along a line substantially normal to the plate.

8. In combination with a camera, a view finder including a plate having a view aperture, means constructed and designed to hold the plate with the aperture in fixed relation to one of the observer's eyes including an abutment adapted to rest against the outer margin of the eye socket, and adjustable means for supporting said abutment whereby the distance between the abutment and view aperture may be varied, said means comprising a plate hinged to the first mentioned plate and having a flange adapted to enter any one of a plurality of grooves in the abutment, and means for securing the abutment to the plate.

9. In combination with a camera, a view finder including a plate having a view aperture, means constructed and designed to hold the plate with the aperture in fixed relation to one of the observer's eyes including abutments adapted to rest against the outer margins of the eye sockets, and adjustable means for supporting said abutments whereby the distances between the abutments and plate may be varied, said means comprising plates hinged to said first mentioned plates and having laterally extending portions, the lateral extension of each plate being adapted to enter any one of a series of recesses in the corresponding abutment, and means for securing the abutment to the plate.

10. In combination with a camera, a view finder including a plate having a view aperture, means constructed and arranged to hold the plate with the aperture in fixed relation to one of the eyes of the operator including an abutment adapted to rest against the lower part of the operator's face, said abutment having an attachment for adjusting it vertically, said attachment comprising a member movable longitudinally of the abutment and rotatable means for effecting such longitudinal movement.

11. In combination with a camera, a view finder including a plate having a view aperture, means constructed and arranged to hold the plate with the aperture in fixed relation to one of the eyes of the operator including an abutment adapted to rest against the lower part of the operator's face, said abutment having an attachment for adjusting it relatively to the aperture which comprises a member movable longitudinally of the abutment and having a circular opening therein, a disc fitting in said opening and pivoted eccentrically to said abutment and a lever connected to said disc whereby the same may be rotated to move said member.

12. In a view finder of the class described, a plate having an aperture, a disc having a view opening rotatably mounted in said aperture, said disc also having a plurality of laterally projecting portions, and a spring latch pivotally mounted on the plate and adapted to engage any one of said projections to hold the disc against rotation.

13. In a view finder of the class described, a plate having an aperture, a disc having a view opening and a plurality of laterally extending pins rotatably mounted in said aperture, and a spring latch pivotally mounted on the plate adjacent the aperture, said latch having a notch adapted to receive any one of said pins, to hold the disc against rotation.

14. In a view finder of the class described, a member having a view aperture therein, a perforated plate hinged to said member and adapted to cover said view aperture or to be swung away therefrom to allow unobstructed vision and means for holding said perforated plate in any position to which it may be turned.

15. In a view finder of the class described, a member having a view aperture therein, a perforated plate hinged to said member and adapted to cover said view aperture or to be swung away therefrom to allow unobstructed vision and a leaf spring frictionally engaging the perforated plate at the hinge, to hold the same in any position to which it may be turned.

16. In a view finder of the class described, a plate member formed with perforations, the perforated area of said member being similar to the exposure area of a camera with which the finder may be used, one of said perforations being centrally located and the adjacent perforations being of different size to distinguish the center perforation.

17. In a view finder of the class described, a plate member formed with perforations, the perforated area of said member being similar to the exposure area of a camera with which the finder may be used, one of said perforations being centrally located and the adjacent perforation being smaller in size to distinguish the center perforation, for the purpose set forth.

18. In combination with a camera, a base plate mounted on the camera, a view finder mounted on the base plate, said finder being rotatable relatively to the camera and base plate to any one of a plurality of operative positions, and interengaging means on said finder and base plate for locking said finder in any one of said operative positions.

19. In combination with a camera, a base plate mounted thereon and having a plurality of apertures, a finder rotatably secured to said base plate and movable to any one of a plurality of operative positions, and a spring pressed latch on said finder adapted to engage one of the apertures of the base plate to lock the finder against rotation.

20. In combination with a camera, a base plate mounted thereon and a finder for said camera rotatably and detachably mounted on said base plate.

21. In combination with a camera, a base plate mounted thereon having a circular aperture therein, and a finder having portions slidably engaging the margin of said aperture whereby the finder is rotatably secured to the base plate.

22. In combination with a camera, a base plate having a circular aperture therein secured to said camera, and a finder having a plurality of members extending around and slidably engaging the margin of said aperture whereby the finder is rotatably secured to the base plate, one of said members being adapted to be manipulated to disengage said margin to permit the detachment of the finder from the base plate.

23. In combination with a camera, a base plate having a circular opening and a finder having a plurality of projections for engaging the margin of said opening, one of said projections comprising a latch for releasably connecting the finder to the base plate.

24. In combination with a camera, a base plate having a circular opening and a finder having three projections for engaging the margin of said opening, two of said projections comprising hook members extending around and under said margin and the third projection comprising a rotatable latch which may be disengaged from said margin to releasably connect the finder to the base plate.

25. In combination, a camera, a finder and means for detachably securing the finder to the camera including headed pins secured to the camera, a plate connected to the finder and having key slots, the headed pins being adapted to extend through and to have locking engagement with said key slots, and a latch on said plate adapted to engage one of said pins to maintain the pins in locking position in the slots.

26. In combination, a camera, a finder and means for detachably securing the finder to the camera, said means including headed pins secured to the camera, a plate member having key slots connected to the finder, and means on said plate for maintaining said pins in locking engagement in said slots.

27. In combination, a camera, a finder, and means for detachably securing the finder to the back of the camera, said means including headed pins secured to the camera, a base plate to which the finder is secured, and a plate hinged to said base plate and having key slots adapted to receive said headed pins, and means on said plate for maintaining said pins in locking engagement in said slots.

28. In combination, a camera, a finder, and means for detachably securing the finder to the camera with hinged movement relatively thereto, said means including headed pins secured to the camera, a plate having key slots adapted to receive said headed pins, means on said plate for maintaining said pins in locking engagement with said slots, a base plate to which the camera may be secured hinged at one edge to said slotted plate, and a latch on the camera for engaging and holding the opposite edge of the base plate.

In testimony whereof I affix my signature.

HERBERT A. McCALLUM.